United States Patent
McKinney

(10) Patent No.: US 7,849,353 B1
(45) Date of Patent: Dec. 7, 2010

(54) METHOD AND APPARATUS FOR AUTOMATICALLY RESTORING A FAILED DISK DRIVE

(75) Inventor: Jack McKinney, Leander, TX (US)

(73) Assignee: Symantec Operating Corporation, Cupertino, CA (US)

( * ) Notice: Subject to any disclaimer, the term of this patent is extended or adjusted under 35 U.S.C. 154(b) by 868 days.

(21) Appl. No.: 10/957,369

(22) Filed: Oct. 1, 2004

(51) Int. Cl.
*G06F 11/00* (2006.01)
(52) U.S. Cl. .............................. 714/6; 714/13
(58) Field of Classification Search ........ 714/6, 714/7, 2, 11–13, 15, 16, 20
See application file for complete search history.

(56) References Cited

U.S. PATENT DOCUMENTS

| | | | |
|---|---|---|---|
| 5,926,836 A * | 7/1999 | Blumenau | 711/162 |
| 6,785,786 B1 * | 8/2004 | Gold et al. | 711/162 |
| 6,820,214 B1 * | 11/2004 | Cabrera et al. | 714/15 |
| 7,222,257 B1 * | 5/2007 | Dibb | 714/6 |
| 2002/0083366 A1 * | 6/2002 | Ohran | 714/13 |

* cited by examiner

*Primary Examiner*—Dieu-Minh Le
(74) *Attorney, Agent, or Firm*—Moser IP Law Group

(57) ABSTRACT

A method and apparatus for automatically restoring the structure and data of a disk drive of a live client computer, i.e., a disk drive that does not store the operating system of the computer system has failed. A "live" computer is one that is booted into an operating system from the computer's own system disks. In one example, the method commences by obtaining a disk layout file from backup storage. This disk layout file typically contains the original disk structure of a particular disk drive. The new disk structure is then rebuilt on a disk drive. Next, file data stored in backup storage is acquired and subsequently written onto the disk drive. In an alternative example, the disk structure on the disk layout file is acquired and adjusted in accordance to the user's needs. This modified disk structure layout is then established on the disk drive.

12 Claims, 3 Drawing Sheets

METHOD AND APPARATUS FOR AUTOMATICALLY RESTORING A FAILED DISK DRIVE

BACKGROUND OF THE INVENTION

1. Field of the Invention

Embodiments of the present invention generally relate to disk recovery systems, and more particularly, to a method and apparatus for automatically restoring a failed disk drive on a live client computer.

2. Description of the Related Art

Modern computer networks generally comprise a plurality of user computers (referred to herein as client computers or clients) connected to one another and to a computer server via a communication network. To provide redundancy and high availability of the information in applications that are executed upon the computer server, multiple computer servers may be arranged in a cluster of nodes forming a server cluster. Such server clusters are available under the trademark VERITAS CLUSTER SERVER from Veritas Software Corporation at Mountain View, Calif. In a server cluster, a plurality of servers communicate with one another to facilitate failover redundancy such that when software or hardware, i.e., computer resources, become inoperative on one server, another server can quickly execute the same software that was running on the inoperative server substantially without interruption. As such, user services that are supported by a server cluster would not be substantially impacted by inoperative server or software. To facilitate high availability and redundancy, the server cluster contains backup servers for redundantly storing data from the various servers within a server cluster. In addition to integrating aspects of failover redundancy into their respective network environments, many businesses also implement additional measures designed to efficiently restore hardware and software system components in the event of a failure.

Currently, there are several applications that are capable of restoring a plurality of files in the event of a disk drive failure. These applications can simply replace the corrupted or lost files by accessing duplicate copies of the original files and subsequently restoring them to a restructured disk drive. As a precaution, these duplicate copies are typically stored on a backup storage device. Similarly, there are applications that have the capability of restoring an entire machine or system. Notably, these applications record the state of the machine's configuration (e.g., TCP/IP configuration), which is to be used as a backup. However, these types of applications require the machine or system to be booted into a recovery-mode in order for the application to successfully implement the restoration process.

Although these backup/restoration applications exist, there are no applications in the industry that allow for the restoration of a single disk drive of a live client computer. In the event a non-system disk drive should fail, a user is typically forced to invest a considerable amount of time and effort attempting to determine the disk structure. This initial step is critical and must be accomplished before any data can be restored to a new disk drive. Since most conventional backup processes do not normally replicate the disk structure, a significant amount of the user's efforts will involve the determination of the disk's original configuration. After ascertaining the layout of the failed disk drive, the user is then further inconvenienced by having to manually rebuild the disk structure on the new disk drive before any data can be restored to the new disk drive.

Therefore, there is a need in the art for a method and apparatus that automatically restores a failed disk drive on a live client computer, including both disk structure and data.

SUMMARY OF THE INVENTION

The invention provides a method and apparatus for automatically restoring a disk drive on a live system, i.e., a disk drive that does not store the operating system of the computer system has failed. A "live" computer is one that is booted into an operating system from the computer's own system disks. In one embodiment, the method commences by obtaining a disk layout file from backup storage. This disk layout file typically contains the original disk structure of a failed disk drive. The new disk structure, which is identical to the layout of the failed disk drive, is then rebuilt on a disk drive. Next, file data stored in backup storage is acquired and subsequently written onto the disk drive.

In an alternative embodiment, the disk structure in the disk layout file is acquired and adjusted in accordance with a user's needs. This modified disk structure layout is then established on the new disk drive and backup data is restored. The opportunity to modify the layout enables a user to, for example, change the partition sizes before the data is stored.

BRIEF DESCRIPTION OF THE DRAWINGS

The following detailed description makes reference to the accompanying drawings which are now briefly described.

While the invention is described herein by way of example using several embodiments and illustrative drawings, those skilled in the art will recognize that the invention is not limited to the embodiments of drawing or drawings described. It should be understood that the drawings in detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to.

DETAILED DESCRIPTION

Figure 1:
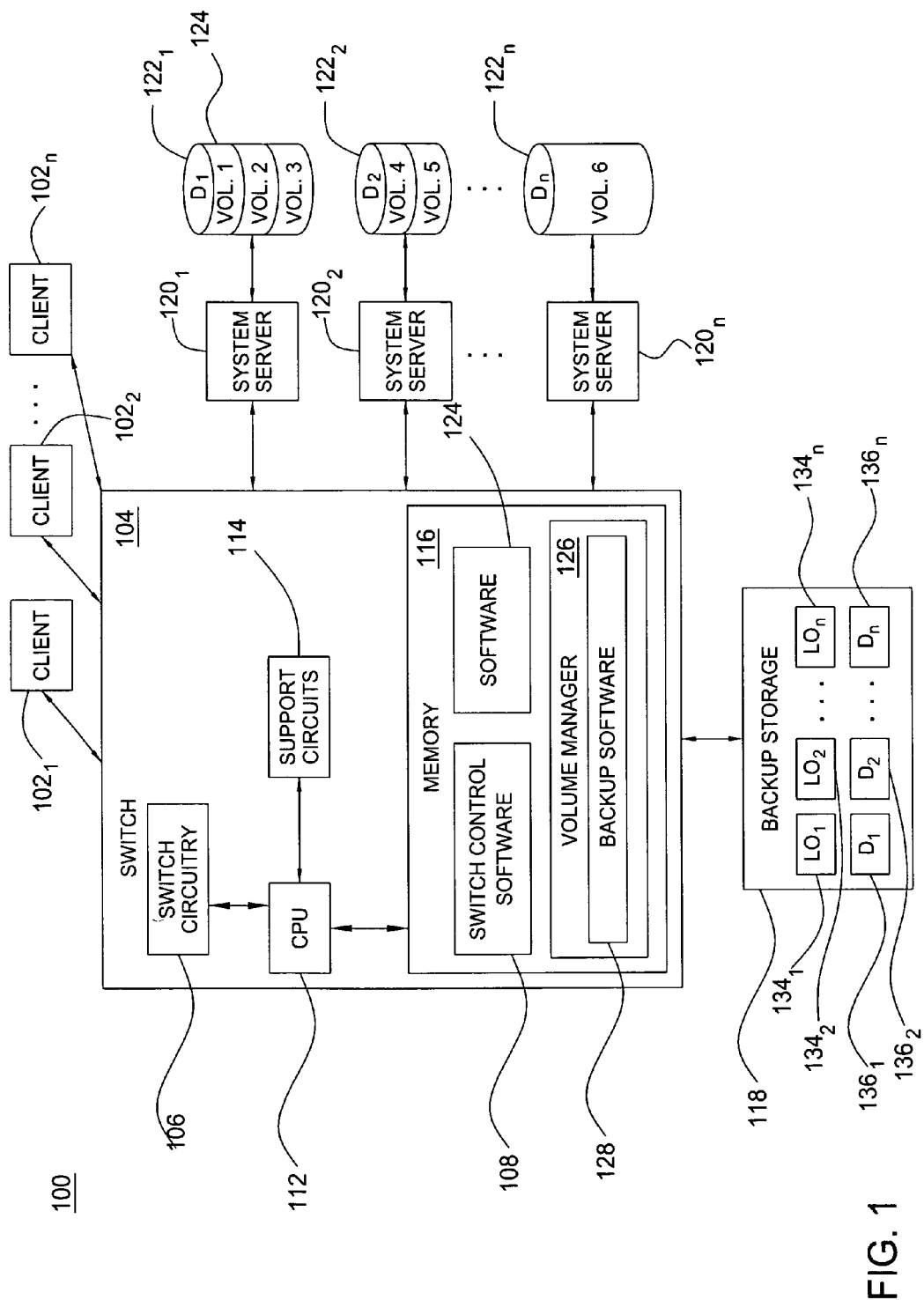
FIG. 1 is a block diagram of a computer system that operates in accordance with the present invention.

FIG. 1 depicts a computer network 100 in which one embodiment of the present invention may be utilized. The invention, as shall be discussed in detail below, is a method and apparatus for automatically restoring a disk drive on a live client computer. A "live" computer is one that is booted into an operating system from the computer's own system disks. Generally speaking, this invention allows for the efficient reconstruction of a disk structure as well as the file restoration of the failed disk drive.

The computer network 100 comprises a plurality of client computers $102_1, 102_2 \ldots 102_n$ that are directly connected to a switch 104. For the sake of simplicity, only one switch 104 is shown. Those skilled in the art will understand that a plurality of switches may be connected to the client computers $102_1 \ldots _n$ and to one another to form a larger network. Similarly, this description will only refer to a client computer 102 that is representative of the plurality of client computers $102_1$ through $102_n$. The client computers $102_{1 \ldots n}$ may include one or more individual computers, wireless devices, personal digital assistants, desktop computers, laptop computers or any other digital device that may benefit from connection to a computer network. The switch 104 is coupled to a backup storage unit 118 and a plurality of system servers $120_1, 120_2 \ldots 120_n$. The system servers $120_{1 \ldots n}$ are directly connected to a corresponding plurality of disk drives $122_{1 \ldots n}$. This description will normally refer to a single system server 120 and a single disk drive 122, which are representative of the plurality of system servers $120_{1 \ldots n}$ and corresponding disk drives $122_{1 \ldots n}$, respectively. Furthermore, each disk drive 122 is partitioned into at least one volume 124. Although each disk drive 122 is typically divided into a plurality of volume sections, a single volume 124 could comprise one or more disk drives.

The switch 104 generally includes at least one central processing unit (CPU) 112, switch circuitry 106, support circuits 114, and memory 116. The CPU 112 is coupled to the memory 116, switch circuitry 106, and support circuits 114 and may include one or more commercially available processors. The switch circuitry 104 includes the requisite circuits that enable the switch 104 to route data packets between the client computers 102 and the plurality of system servers $120_{1 \ldots n}$, as well as between the servers and backup storage 118. The support circuits 114 are well known circuits that include cache, power supplies, clocks, input/output interface circuitry, and the like.

The memory 116 may include random access memory, read only memory, removable disk memory, flash memory, and various combinations of these types of memory. The memory 116 is sometimes referred to as main memory and may in part be used as cache memory. The memory 116 possesses a number of software applications, namely switch control software 108, general software 116, and a volume manager 126. The switch control software 108 is a program responsible for routing the data packets that pass through the switch 104. The general software 124 may include software applications required by the switch 104 to perform additional operations.

The volume manager 126 is a software application that defines the volume structures (e.g., file systems) and manages the storage configurations of the disk drives $122_{1 \ldots n}$ belonging to the system servers $120_{1 \ldots n}$. In addition, the volume manager 126 also contains backup software 128 that controls the disk drive 122 backup process.

The backup storage 118 is directly coupled to the switch 104. This unit is utilized for storing the layout files $134_{1 \ldots n}$ that contain the disk structure of the disk drives $122_{1 \ldots n}$. The backup storage 118 may include at least one of a storage volume, memory cache, disk drive, optical disk (e.g., CD-ROM), or tape drive. The data stored in the layout files $134_{1 \ldots n}$ include the types of diskgroups and volumes 124 present on the disk drives 122, the size of each of the disk drives 122, the layout of the volume partitions that form the volumes 124, the type of disk array (e.g., striped, software RAID level, etc.), and the type of volume manager 126 originally used to create the disk structure. The backup storage 118 also contains the data files $136_{1 \ldots n}$ which contain the data stored on the disk drives $122_{1 \ldots n}$ belonging to the system servers $120_{1 \ldots n}$. Each data file 136 contains the data for a corresponding disk drive 122. The data files may be compressed to facilitate efficient use of storage space in the backup storage 118. Although a switch 104 is illustratively used for interconnecting the clients, servers and backup storage, those skilled in the art will realize other hardware and software configurations may be used for this purpose.

Figure 2:
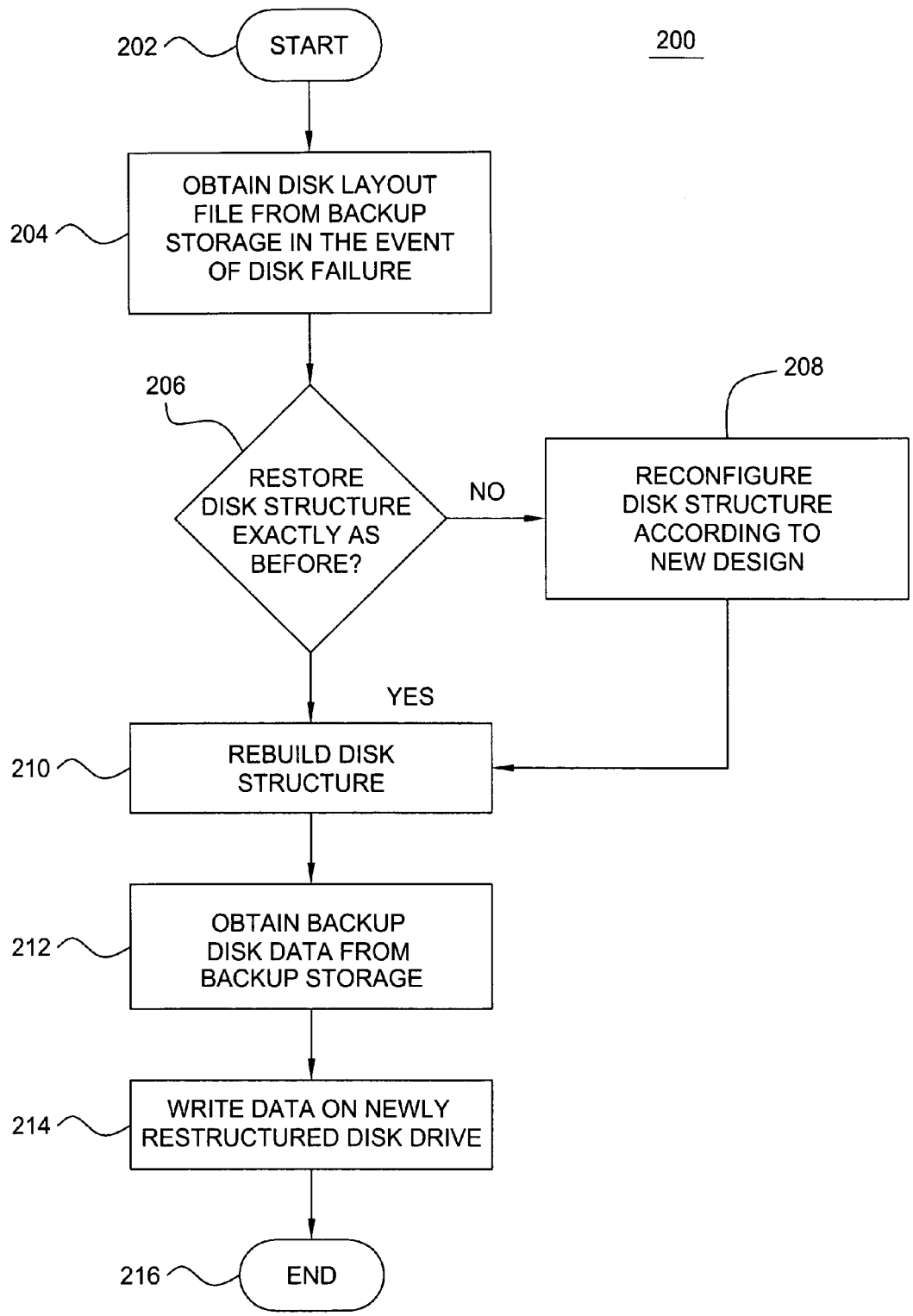
FIG. 2 depicts a flow diagram of a method for automatically restoring a disk drive in accordance with the present invention.

FIG. 2 depicts a flow diagram of a method for automatically restoring a disk drive on a live client computer 102 in accordance with the present invention. In addition to the fact that this invention functions on a live client computer 102, the disk drives being restored are non-system disks (i.e., disks that are not part of the running operating system). The method 200 begins at step 202 and proceeds to step 204, where a disk layout file 134 is obtained from backup storage 118 in the event of a non-system disk drive failure. The disk layout file 134 is a file that is typically created by a machine restoration application (see method 300, FIG. 3) and contains data that describes the layout of the failed disk structure. At step 206, a determination is made as to whether an exact replica of the original disk structure should be constructed on a new disk drive 122 on a live client computer 102. If a modified version of the original disk structure is to be built on the new disk drive 122, then the method 200 continues to step 208. At step 208, the disk structure design is altered in accordance to the desired modifications and the method 200 continues to step 210. Aspects of the disk layout that can be altered include, but are not limited to, the size of the volumes 124, the types of volumes 124, the volume manager 126 used on the disk drive 122, the volume type attributes (i.e., RAID level) such as striping and mirroring, the disk drives 122 the volume should use, and the like. If instead it is decided at step 206 to rebuild the new disk structure as a replica of the original disk layout on a live client computer 102, then the method 200 proceeds directly to step 210.

At step 210, the selected disk layout (i.e., original or modified version) is successfully rebuilt on the non-system disk drive 122. At step 212, the corresponding system server 120 of the new disk drive 122 obtains the backup disk data 136, which previously belong to the failed disk drive, from the backup storage 118. At step 214, the disk data 136 acquired from backup storage 118 is written on the restructured disk drive 122. The method 200 then ends at step 216.

Figure 3:
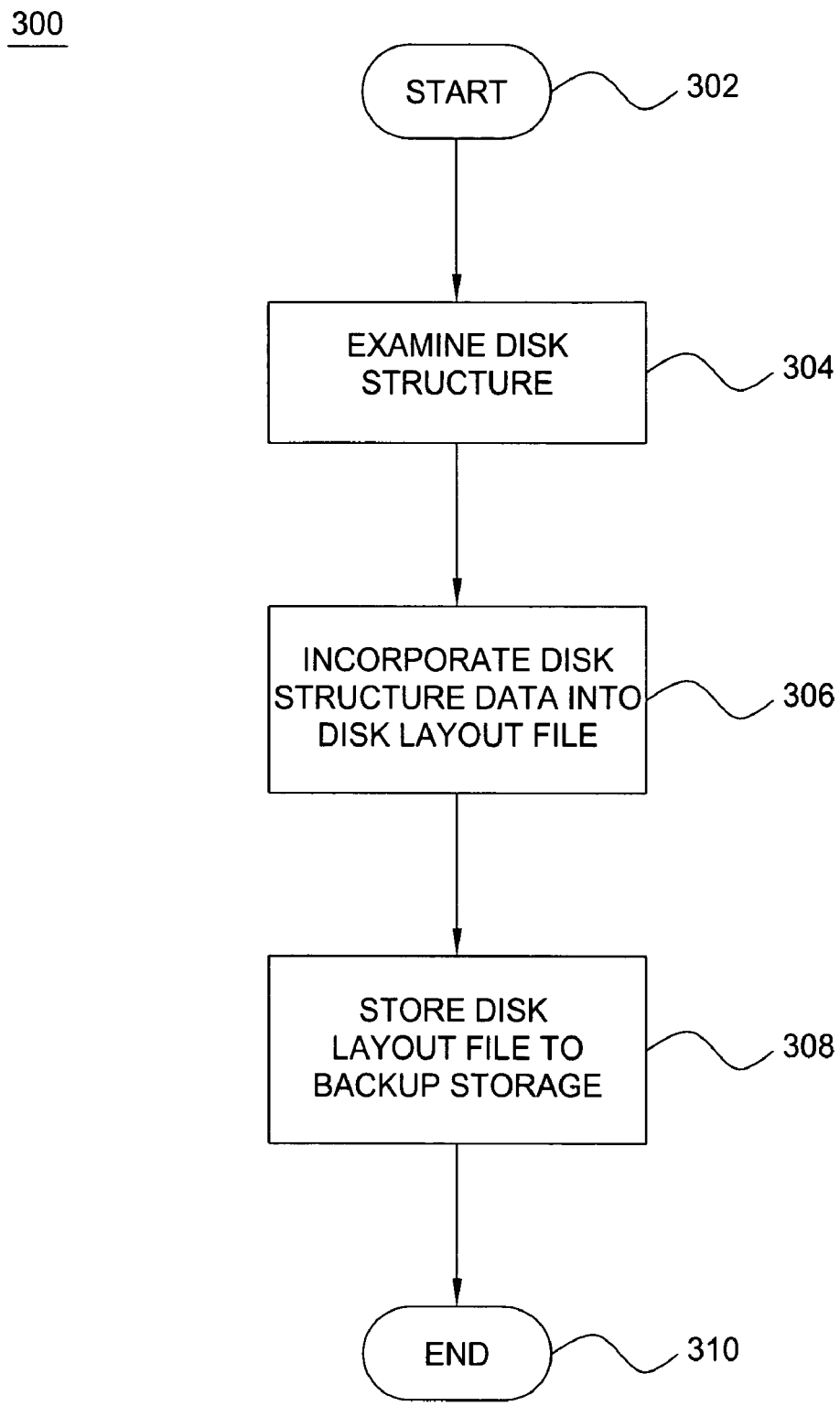
FIG. 3 depicts a flow diagram of a method for creating layout files in accordance with the present invention.

FIG. 3 depicts a flow diagram of a method 300 for creating the disk layout files $134_{1 \ldots n}$ to be used on a live system in accordance with the present invention. This description of method 300 will only refer to a disk layout file 134 that is representative of the plurality of disk layout files $134_1$ through 134. The method 300 begins at step 302 and proceeds to step 304, where the disk structure is examined. At step 306, a disk layout file is created as part of a regularly scheduled backup. At the beginning of the backup process, the client computer 102 executes a program that collects all of the necessary disk structure data needed to rebuild the disk layout. This disk structure data is then incorporated into a disk layout file 134. At step 308, the disk layout file 134 is stored to backup storage 118 to be used in the future should the file's corresponding disk drive 122 fail. The method 300 then ends at step 310.

The present invention provides a method and apparatus for automatically reconstructing the layout of disk drive of a live client computer in the event of a disk drive failure. More specifically, the original disk structure of a failed non-system disk drive, which is stored in a disk layout file, is acquired from a backup storage unit and ultimately reconstructed on a new disk drive via an automated process. Alternatively, the original disk layout may be modified in accordance to a user's needs before the disk structure is fabricated on the new disk drive. Consequently, the present invention fulfills the need in the art for an improved method for restoring a failed disk drive on a live system.

While the foregoing is directed to embodiments of the present invention, other and further embodiments of the invention may be devised without departing from the basic scope thereof, and the scope thereof is determined by the claims that follow.

What is claimed is:

1. A method for automatically restoring a disk drive of a live client computer, comprising:
    obtaining a disk layout file from backup storage of said live client computer, wherein said disk layout file represents an original disk structure comprising at least one of: information pertaining to types of diskgroups present on said disk drive, types of volumes present on said disk drive, size of each of said disk drive, partition layout of said volumes, type of disk array, software RAID level of said disk array, and type of volume manager originally used to create said original disk structure, said live client computer being booted into an operating system from a system disk drive;
    creating a new disk structure on said disk drive of said live client computer in accordance with said disk layout file after said live client computer has been booted into the operating system from the system disk drive and before any file data has been written to said disk drive;
    acquiring file data from said backup storage; and
    writing said file data onto said disk drive.

2. The method of claim 1, wherein said creating step further comprises:
    establishing said new disk structure on said disk drive in accordance to said original disk structure.

3. The method of claim 1, wherein said creating step further comprises:
    establishing said new disk structure on said disk drive in accordance with a modified disk structure layout, wherein said modified disk structure layout is a modified version of said original disk structure.

4. The method of claim 1, wherein said disk layout file is created from a server restoration application.

5. A system for providing data backup with a network comprising at least one server coupled to at least one live client computer; at least one disk drive of said live client computer, said live client computer being booted into an operating system from a system disk drive; backup storage for storing data and a disk layout file for said at least one disk drive, said disk layout file comprising at least one of information pertaining to types of diskgroups present on said disk drive, types of volumes present on said disk drive, size of said disk drive, partition layout of said volumes, type of disk array, software RAID level of said disk array, and type of volume manager originally used to create said disk structure; means for routing data between said at least one server, said at least one live client computer and said backup storage; wherein, upon the failure of a non-system disk drive, said disk layout file is used to define a disk structure for a replacement disk drive and said data is stored upon said replacement disk drive after the live client computer has been booted into the operating system from the system disk drive and before said data has been written to the replacement disk drive.

6. The system of claim 5, wherein said disk structure on said disk drive is established in accordance with an original disk structure defined by said disk layout file.

7. The system of claim 5, wherein said disk structure on said disk drive is established in accordance with a modified disk layout file, wherein said modified disk layout file defines an adjusted version of said disk structure.

8. The system of claim 5, wherein said disk layout file is created from a server restoration application.

9. Apparatus for automatically restoring a disk drive of a live client computer, comprising:
    means for obtaining a disk layout file from backup storage of said live client computer, said live client computer being booted into an operating system from a system disk drive, wherein said disk layout file represents an original disk structure comprising at least one of: information pertaining to types of diskgroups present on said disk drive, types of volumes present on said disk drive, size of each of said disk drive, partition layout of said volumes, type of disk array, software RAID level of said disk array, and type of volume manager originally used to create said original disk structure;
    means for creating a new disk structure on said disk drive of said live client computer in accordance with said disk layout file after said live client computer has been booted into the operating system from the system disk drive and before any file data has been written to the disk drive;
    means for acquiring file data from said backup storage; and
    means for writing said file data onto said disk drive.

10. The apparatus of claim 9, wherein said means for creating further comprises:
    means for establishing said new disk structure on said disk drive in accordance to said original disk structure.

11. The apparatus of claim 9, wherein said means for creating further comprises:
    means for establishing said new disk structure on said disk drive in accordance with a modified disk structure layout, wherein said modified disk structure layout is a modified version of said original disk structure.

12. The apparatus of claim 9, wherein said disk layout file is created from a server restoration application.

* * * * *